(No Model.)

J. H. NICHOLS.
HITCHING DEVICE.

No. 361,230. Patented Apr. 12, 1887.

WITNESSES
Franck L. Ourand
Benj. G. Cowl

INVENTOR
John Harmon Nichols,
by Louis Bagger & Co.
Attorneys

United States Patent Office.

JOHN HARMON NICHOLS, OF ELKTON, TENNESSEE, ASSIGNOR OF ONE-HALF TO JOHN E. BAUGH, OF SAME PLACE.

HITCHING DEVICE.

SPECIFICATION forming part of Letters Patent No. 361,230, dated April 12, 1887.

Application filed February 14, 1887. Serial No. 227,487. (No model.)

*To all whom it may concern:*

Be it known that I, JOHN HARMON NICHOLS, a citizen of the United States, and a resident of Elkton, in the county of Giles and State of Tennessee, have invented certain new and useful Improvements in Hitching Devices; and I do hereby declare that the following is a full, clear, and exact description of the invention, which will enable others skilled in the art to make and use the same, reference being had to the accompanying drawings, which form part of this specification, and in which—

Figure 1:
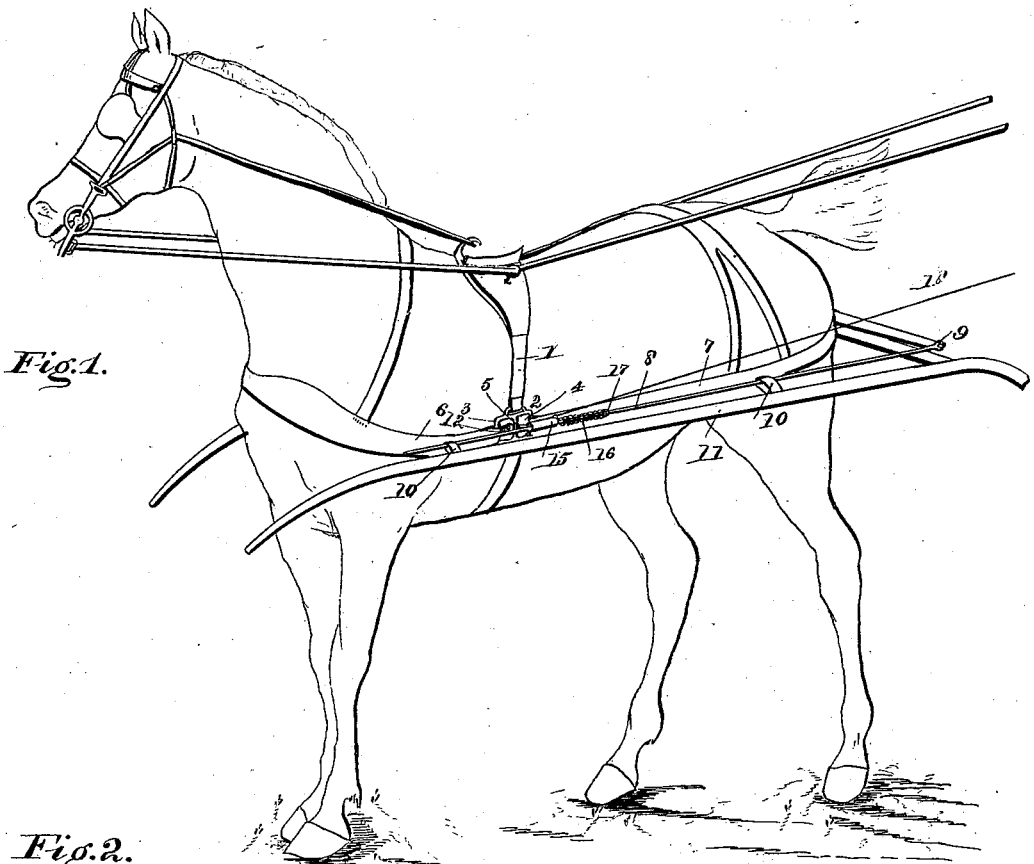
Figure 2:
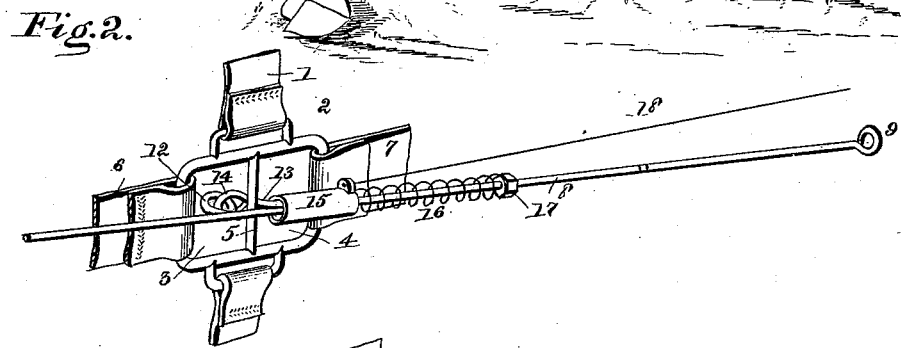
Figure 3:
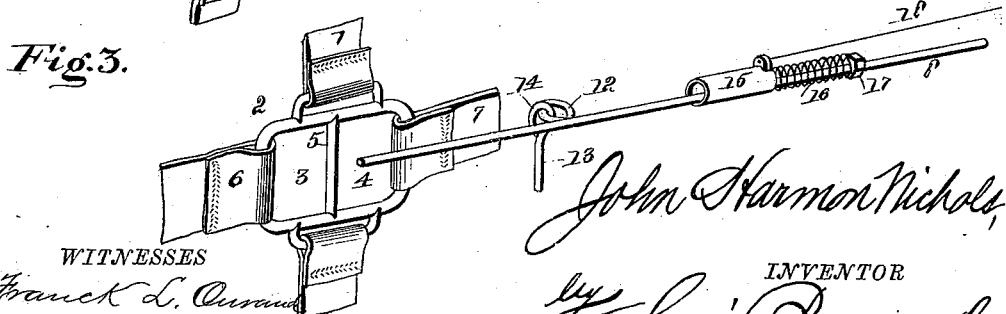

Figure 1 is a perspective view of as much of the thill of a vehicle and of the harness of a horse as is sufficient to illustrate my invention. Fig. 2 is a similar view of the device detached from the harness; and Fig. 3 is a similar view of the device, showing the hook or pivoted arm released.

Similar numerals of reference indicate corresponding parts in all the figures.

My invention has relation to that class of hitching devices for attaching a horse to a vehicle in which a buckle suitably connected to the trace and to the holdback of the harness is detachably attached to the thill; and it consists in the improved construction and combination of parts of such a device in which the buckle upon the trace and holdback may be detached from the thill by pulling a strap or cord extending from the device to the seat of the vehicle, allowing the horse to run freely out of the shafts, as hereinafter more fully described and claimed.

In the accompanying drawings, the numeral 1 indicates the back-strap of the harness, to which the buckle 2 is attached, the said buckle consisting of two loops, 3 and 4, extending forward and rearward and having a cross-piece, 5, separating them.

The trace 6, which is of sufficient length to extend to the back-strap, is attached with its rear end to the forward loop, 3, of the buckle, and the holdback 7 is attached with its forward end to the rear loop of the buckle, the buckle being thus secured between the trace and the holdback. A metallic rod, 8, is formed with an eye, 9, at its rear end, with which eye it is attached to the single-tree, and this rod is secured by means of guide loops or bails 10 to the thill 11, and near the forward end the rod is formed with an eye, 12, formed by bending the rod, the said eye having the forward portion extending above the eye, leaving the forward side of the loop free. An arm, 13, is pivoted to the forward side of the eye, having preferably a small eye, 14, fitting upon the said side of the eye, and a sleeve, 15, slides upon the rod to the rear of the eye, being of a sufficient diameter to fit over the rod and over the free rear end of the arm, the arm being curved near its pivotal eye, so that it may form an eye for attaching it to the cross-bar of the buckle when the sleeve is drawn back and the arm hooked in over the said cross-bar. The sleeve has the forward end of a coiled spring, 16, which is wrapped around the rod, bearing against its rear end, and the rear end of this spring bears against a nut, 17, fitting upon the rod, the spring serving to hold the sleeve over the free end of the curved arm by forcing the said sleeve forward. A suitable string or strap, 18, may be attached to the sleeve and extend to the seat of the driver or any other convenient place in the vehicle, and it will be seen that when the curved arm has been secured around the cross-bar of the buckle and the sleeve has been forced over the end of the arm the sleeve may be drawn back by the said strap or cord, allowing the arm to swing free and the buckle to be detached from the rod.

In this manner it will be seen that when the buckle is attached at each side of a set of harness to the trace and holdback, and the horse with this harness is placed between the thills of a vehicle having the metallic rods secured in the guide-loops to the thills, the pivoted arms of the rods may be hooked over the cross-pieces of the buckles, and the free ends of the arms secured by the sleeves being forced forward by the springs, when the horse will be securely hitched to the vehicle, being able to draw the vehicle by the traces being attached to the buckles and the rod being attached to the single-tree, and to hold the vehicle back by having the holdback attached to the buckle, the holding back of the vehicle falling principally on the single-tree instead of upon the thills, preventing the latter from being raised up at the ends, as they are liable to be by the usual means of hitching. In this manner the horse may be hitched to the vehicle by simply securing the buckles to the rods upon the thills, and the horse may be detached by simply drawing the sleeves back, which in the case of a run-away may be done in a moment of time by simply drawing back upon the straps or cords attached to the sleeves.

It will thus be seen that this device not only forms a simple and easily-operated hitching device, but that it at the same time is a perfect horse-detacher, adding security to the simplicity of the device. It follows that the buckle may be modified in construction so that it may be secured in various manners to harness, as a harness of special construction may be made to suit the buckle, and, if desired, the eye and its pivoted arm may be formed directly upon the thill, the sleeve in this case sliding upon the thills, and the draft and holdback falling entirely upon the thills of the vehicle.

Having thus described my invention, I claim and desire to secure by Letters Patent of the United States—

In combination with a buckle having a forward loop for attaching it to a trace and a rear loop for attaching it to a holdback-strap, and having a cross-bar separating the loops, a rod secured at its rear end to the single-tree and secured in guide-loops to the thill, and formed with an eye near the forward end of the rod, the said eye being formed by bending the rod, an arm pivoted with the inner end of its curved portion to the forward side of the eye, a sleeve upon the rod to the rear of the eye fitting over the free straight end of the arm, a spring wrapped around the rod and bearing against the sleeve and against a nut upon the rod, forcing the sleeve forward, and a cord or strap secured to the sleeve and carried to the vehicle, as and for the purpose shown and set forth.

In testimony that I claim the foregoing as my own I have hereunto affixed my signature in presence of two witnesses.

JOHN HARMON NICHOLS.

Witnesses:
WILLIAM RAYMOND RIDGWAY,
MILTON ANDERSON CARTER, Jr.